No. 886,834. PATENTED MAY 5, 1908.
A. MICHELIN.
PRESSURE CONTROLLER.
APPLICATION FILED NOV. 4, 1907.
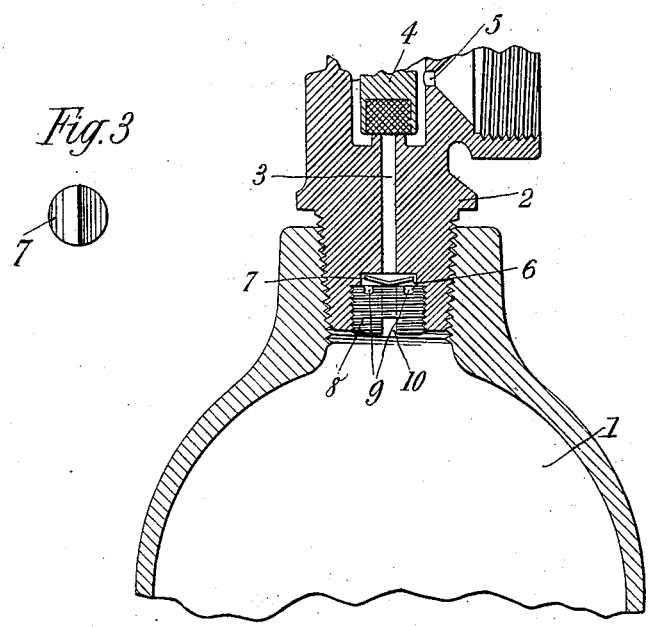
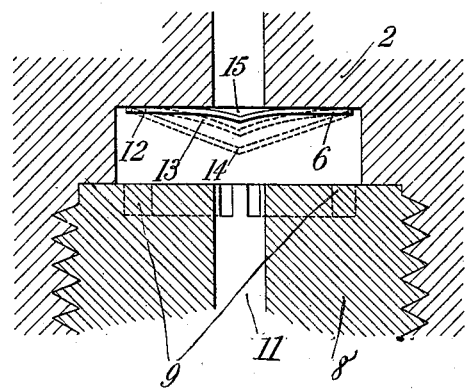

UNITED STATES PATENT OFFICE.

ANDRÉ MICHELIN, OF PARIS, FRANCE.

PRESSURE-CONTROLLER.

No. 886,834.  Specification of Letters Patent.  Patented May 5, 1908.

Application filed November 4, 1907. Serial No 400,467.

*To all whom it may concern:*

Be it known that I, ANDRÉ MICHELIN, citizen of the Republic of France, and resident of Paris, 105 Boulevard Péreire, in the said Republic, engineer, have invented a new and useful Improvement in Pressure-Controllers, of which the following is a specification.

Receptacles containing compressed air or gases at high pressure are generally provided with a special gradually opening cock or releasing device, serving to permit of the slow outflow of the gases. But the manipulation of a cock of this nature, whatever the mode of operation may be requires on the part of the operator prudent tentative control which must be all the greater the higher the pressure in the receptacle may be; the automatic release devices are generally complicated. If, in spite of every precaution the release of the gas is effected suddenly, it may occasion accidents, such for example as the bursting of the manometer of which use is made for regulating the outflow from the cock. In the case where pneumatic tires of automobile or other vehicles are being inflated by means of an air reservoir containing air compressed to a high pressure, 150 to 200 atmospheres for example, the sudden bursting of the tire may result. For avoiding these disadvantages, it has already been tried to arrange in the receptacle in front of the cock, a valve maintained on its seat by the interior pressure, the valve allowing a slight leakage to take place through it, for example, by a groove or a slight deformation, either of the valve itself, or of its seat. But apart from the difficulty, from an industrial point of view, of constructing valves which allow exactly the same leakage, this arrangement has the inconvenience of presenting to the fluid an escape orifice of constant section for the same valve. It follows that the outflow from the valve diminishes in proportion to the decrease of the interior pressure of the receptacle; the inflation of a pneumatic tire of a wheel, for example, therefore requires about four times more time when the receptacle contains a pressure of 15 atmospheres than for a first inflation, when the initial pressure of the receptacle is that of 150 atmospheres.

The arrangement constituting the subject of the present invention has for its object to render the sudden release of the gases under high pressure impossible, no matter what the inexperience of the operator and how sudden the opening of the cock may be, while at the same time to insure an uniform outflow, no matter what the diminution of the pressure of the gas in the receptacle may be.

Figure 1 of the accompanying drawing represents the arrangement in question applied to the interior of the cock closing a compressed gas receptacle. Fig. 2 is a view on a larger scale intended to enable the working of the arrangement to be more readily understood; Fig. 3 illustrates the principal organ or elastic flap which is the basis of the invention.

1 is a metallic receptacle to which is screwed the cock 2 (which is only partially shown in the drawing, the arrangement being applicable to all kinds of cocks for this purpose); 3 is the channel for the passage of the gas, closed by valve 4, which is a screw-down valve operated from the exterior. When the valve 4 is raised, the gas can escape by the channel 5 of the exit tube for effecting the work it is intended to perform. 6 is the seat of the elastic flap 7. This flap 7 is maintained in its seat by the valve 8, which leaves it the necessary play for its proper operation. This valve is only here shown as an example; it may be of any suitable form and may even be replaced by any other arrangement capable of preventing the flap 7 from falling into the receptacle. 9 are radial grooves provided in the surface of the valve 8 and serving to permit the filling of the receptacle 1 by avoiding that the flap 7 should completely obstruct the hole 11 formed in the valve 8 when it is applied thereto; or such obstruction may be prevented by other convenient means. The air or gas supplied by the compressor thus, during the filling, flows round the flap 7 and passes into the receptacle 1 through the grooves 9 and the channel 11. 10 is a groove provided in the valve 8 for facilitating its fitting.

The flap 7 is of metal forming a spring, of suitable dimensions. It may be of any form, but is preferably circular; it is bent or curved so that its profile presents the form of a circumflex accent of which the two branches may be straight or bent. The receptacle 1 being charged with gas at high pressure and the valve 4 of the cock 2 being closed, the flap 7 does not operate. The pressure contained in the channel 3 is then, in fact, the same as that of the receptacle 1. If the valve 4 is opened, even brusquely, the gas contained in the channel 3 at once escapes and tends to be replaced by that from the receptacle 1. But, in rushing through the central hole 11 of the valve 8, the gas carries with it the flap 7 and forces it to its seat 6 in the position indicated by the numeral 12 in Fig. 2. In this position of the flap, the compressed gas finds no other exit but through the channel 15, limited by the curve or span of the flap 7, on the one hand, and by the flat surface of the seat 6, on the other hand, the gas therefore flows out through this special orifice the more slowly according as the curve or span of the flap 7 is forced upon its seat. But the flap 7, by virtue of its own elasticity, tends to resume its normal form; it is prevented from so doing by the pressure which acts on its surface and which decreases in proportion to the outflow of the gas. The flap 7 can only therefore resume its normal form 14 (Fig. 2) very progressively by passing through all the intermediate forms 13 comprised between the form 12 and the form 14 shown in Fig. 2. In these different positions, the channel 15 automatically becomes larger and larger and offers to the outflow of the gas less resistance as the pressure in the receptacle becomes less. It will thus be understood that the outflow of the gas may proceed in a very regular manner no matter what the initial pressure in the receptacle 1 may be and right up to the complete exhaustion of the gas contained in this receptacle.

What I claim as my invention, and desire to secure by Letters Patent, is:—

1. The combination of a receptacle suitable for containing a compressed fluid; a part closing the exit opening of said receptacle; a chamber in said part; a channel placing this chamber in communication with the interior of the receptacle; a second channel placing the same chamber in communication with the exterior; a valve by means of which this second channel may be closed at will, and an elastic plate bent to an angular form, inserted in said chamber and the convex part of which is directed towards the side of the receptacle, in such a manner that the plate spreads out in proportion to increase of pressure.

2. The combination of a receptacle suitable for containing a compressed fluid; a part closing the exit orifice of said receptacle; a chamber in said part; a conduit placing this chamber in communication with the interior of the receptacle; a second channel placing the same chamber in communication with the exterior; a valve by means of which this second channel may be closed at will, an elastic plate bent to an angular form, inserted in the said chamber and the convex part of which is directed towards the side of the receptacle, in such a manner that the plate spreads out in proportion to increase of pressure; and radial grooves sunk in that wall of the said chamber which is opposite the convex face of the said angular elastic plate.

In testimony, that I claim the foregoing as my invention, I have signed my name in presence of two witnesses, this 23rd day of October 1907.

ANDRÉ MICHELIN.

Witnesses:
H. C. COXE,
ALCIDE FABE.